United States Patent [19]

Takata

[11] Patent Number: 4,802,775
[45] Date of Patent: Feb. 7, 1989

[54] ROLLER BEARING

[75] Inventor: Hirotoshi Takata, Yokohama, Japan

[73] Assignee: Nippon Seiko Kabushiki Kaisha, Tokyo, Japan

[21] Appl. No.: 203,879

[22] Filed: Jun. 8, 1988

[51] Int. Cl.$^4$ .............................................. F16C 19/26
[52] U.S. Cl. .................................... 384/450; 384/558; 384/568
[58] Field of Search ............... 384/450, 568, 569, 558, 384/565, 571

[56] References Cited

U.S. PATENT DOCUMENTS

| | | | |
|---|---|---|---|
| 3,740,108 | 6/1973 | Fernlund | 384/568 |
| 4,227,754 | 10/1980 | Kellström | 384/450 |
| 4,345,800 | 8/1982 | Hofmann et al. | 308/217 |
| 4,557,613 | 12/1985 | Tallian et al. | 384/568 |
| 4,705,411 | 11/1987 | Kellstrom | 384/450 |

FOREIGN PATENT DOCUMENTS

| | | |
|---|---|---|
| 52-49541 | 12/1977 | Japan . |
| 57-61933 | 12/1982 | Japan . |
| 60-175818 | 9/1985 | Japan . |
| 1441802 | 7/1976 | United Kingdom . |
| 1487579 | 10/1977 | United Kingdom . |

*Primary Examiner*—Lenard A. Footland
*Attorney, Agent, or Firm*—Shapiro and Shapiro

[57] ABSTRACT

A roller bearing comprising an inner race, an outer race and rollers arranged between these races has a predetermined relationship between a maximum diameter of each roller of the bearing, a length of each roller, and radius of curvature of a contacting portion between a rolling surface of the roller and a chamfer portion of the roller.

1 Claim, 2 Drawing Sheets

MAXIMUM CONTACT
STRESS DISTRIBUTION

MAXIMUM CONTACT
STRESS DISTRIBUTION

MAXIMUM CONTACT
STRESS DISTRIBUTION

ROLLER BEARING

BACKGROUND OF THE INVENTION

1. Field of the Invention

This invention relates to a roller bearing capable of preventing stress concentration and useful as a bearing for installations and/or apparatuses which are required for a long-term operation and high reliability.

2. Related Background Art

In a roller bearing, for example, such as a self-aligning roller bearing, radius (R) of a corner of a spherical roller, i.e., radius of curvature (Rk) of a boundary portion between a rolling surface and a chamfer portion of the spherical roller (FIG. 2) has not yet been noted up to the present. Thus, conventional roller bearings including a self-aligning roller bearing had the following disadvantages.

As shown in FIG. 2, if the radius of curvature Rk of the corner edge 30 of the roller 20 contacted with a race 10 is smaller than an optimum value, when the bearing is subjected to a load, the stress is concentrated to this corner edge, thus reducing the rolling fatigue life, and increasing the wear or generating the seizure in certain circumstances.

To the contrary, if the radius of curvature Rk of the corner edge of the roller is larger than the optimum value, when the bearing is subjected to a heavy load, the corner edge cannot act as stress relaxation means and thus the stress is concentrated around the corner edge, thereby reducing the rolling fatigue life, and increasing the wear or generating the seizure in certain circumstances, as in the above case.

In order to obtain the optimum stress distribution, a technique in which a so-called "crowning" is adopted for reducing the radius of curvature of a portion adjacent to both ends of the roller has been proposed, for example, as disclosed in the Japanese Patent Publication No. 52-49541. However, in this case, if the radius of curvature of the corner edge of the roller has not the optimum value, in some cases, the stress relaxation by means of the crowning cannot effectively be achieved according to load.

OBJECT AND SUMMARY OF THE INVENTION

To solve the above-mentioned problems, the present invention is constructed to satisfy the following relationship:

$$0.04 \sqrt{Da \cdot lr} \leq Rk \leq 0.20 \sqrt{Da \cdot lr}$$

wherein, Rk is the radius of curvature of the corner edge of a connecting portion between a rolling surface of the roller and a chamfer portion of the roller, Da is a maximum diameter of the roller, and lr is a length of the roller.

In the roller bearing according to the present invention, even when the bearing is subjected to a heavy load, since it is difficult to create edge stress in contact stress between the rolling surface of the roller and the rolling surface of the race, the rolling fatigue life is increased or extended, and the wear and seizure are hard to occur.

Further, the roller bearing according to the present invention, even when subjected to an intermediate or light load, can maintain the uniformity of the contact stress distribution, as same as in the conventional roller bearing, or more.

DETAILED DESCRIPTION OF THE PREFERRED EMBODIMENT

Figure 1:
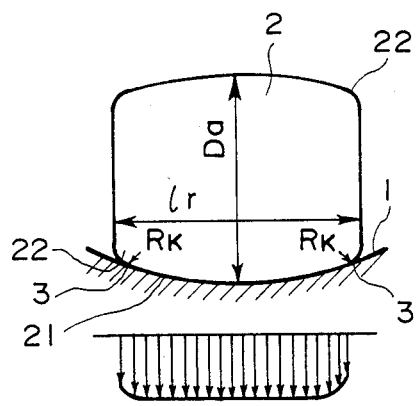
FIG. 1 is a view showing the details and maximum contact stress distribution in an embodiment wherein the present invention is adapted to a self-aligning roller bearing.
Figure 2:
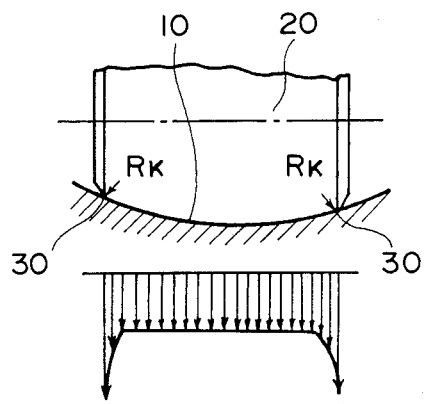
FIG. 2 is a view showing a roller and maximum contact stress distribution in a conventional self-aligning roller bearing.

FIG. 1 shows an embodiment wherein the present invention is adapted to a self-aligning roller bearing. The roller bearing comprises a race 1 and a barrel shaped roller 2. A reference numeral 3 denotes a corner edge of a connecting portion between a rolling surface 21 of the barrel shaped roller and a chamfer portion 22 of the roller. When radius of curvature of the corner edge 3 is represented by Rk, a length of the roller is represented by lr, and a maximum diameter of the roller is represented by Da, the radius of curvature Rk of the corner edge satisfies the following relationship, in connection with the length lr and the maximum diameter Da:

$$0.04 \sqrt{Da \cdot lr} \leq Rk \leq 0.20 \sqrt{Da \cdot lr} \qquad (1)$$

The above relationship is determined by a first selecting suitably values of the radius of curvature Rk of the corner, with respect to various bearings, and then calculating the stress distribution in the bearing on the basis of a peculiar method, and by performing precise calculation by use of special calculating equations regarding the service life.

To begin with, a graph showing the relationship between the radius of curvature Rk of the corner edge of the roller and service life ratio was sought for: and from the result of the above, it was foreseen that a certain suitable range of the radius of curvature Rk of the corner edge exists to increase the service life ratio according to the size of the bearing.

If the radius of curvature Rk of the corner edge is too small, since the edge stress is increased, it was considered that the sevice life is decreased.

On the other hand, if the radius of curvature Rk of the corner edge is too large, since the rolling surface approaches to a flat configuration, it is impossible to obtain an amount of removal required for avoiding stress concentration at the contacting end portions; and accordingly, since the edge stress is increased, it was considered that the service life is decreased at the corner edge of the roller.

Therefore, it was anticipated that a certain suitable range of the size of the corner edge exists to obtain the proper contact stress distribution.

Further, since the size of the roller used in the bearing is increased in proportion to the size of the bearing, it was also anticipated that the magnitude of the radius of curvature Rk of the corner edge can be determined to a certain extent in relation to the diameter and/or length of the roller.

Figure 3:
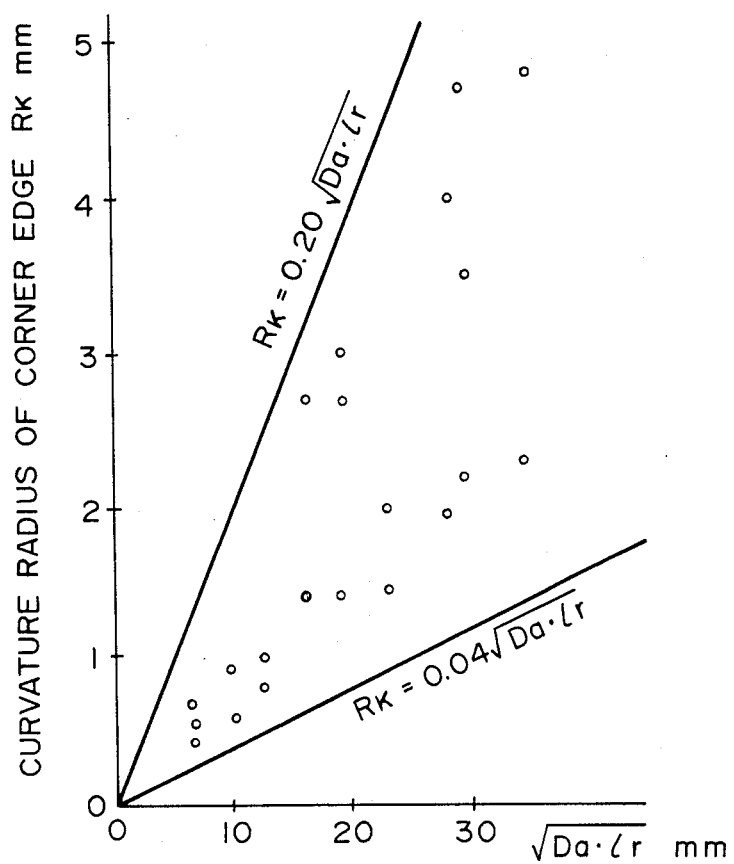
FIG. 3 is a graph showing the relationship between radius of curvature of the corner edge of the roller, and diameter and length of the roller (i.e., $\sqrt{Da \cdot lr}$).

FIG. 3 shows the relationship between the radius of curvature Rk of the corner edge of the roller, and the maximum diameter Da and length lr of the roller, with regard to various bearing having a long calculated service life.

From FIG. 3, it was understood that the radius of curvature Rk of the corner edge must be increased according to the increase of the maximum diameter Da and length lr of the roller, and it was testified that the longer service life of the bearing is obtained insofar as the value of the radius of curvature Rk is in the range limited by the above relationship (1).

As stated above, by selecting the value of the radius of curvature Rk of the corner edge of the roller to a value included in the range limited by the above relationship (1), even when the bearing is subjected to the load, as shown in FIG. 1, the edge stress is not created and uniform maximum contact stress distribution can be obtained.

In the above embodiment, the barrel shaped roller bearing was explained; however, it should be noted that, even in a tapered roller bearing and a cylindrical roller bearing, by selecting radius of curvature of a corner edge of each of rollers of such bearing to satisfy the above-mentioned relationship (1), it is possible to prevent the generation of the edge stress and to increase or lengthen the service life of the bearing.

In the roller bearing according to the present invention, even when the bearing is subjected to the heavy load, since it is difficult to generate or create the edge stress in the contact stress between the rolling surface of the roller and the rolling surface of the race, the rolling fatigue life is extended, and the wear and seizure are hard to occur.

Further, even when the roller bearing is subjected to the intermediate or light load, since the contact stress distribution is maintained more uniformly than that in the case of the conventional roller bearings, the rolling fatigue life of the bearing is not shortened but rather extended.

Further, since the radius of curvature Rk limited by the above relationship (1) is determined only by the representative sizes (i.e., maximum diameter Da and length lr) of the roller, if only the rollers having such radius of curvature Rk are prepared, such rollers can be commonly adapted to variously designed bearings, thus simplifying the design of the bearing, facilitating the care or control of the parts due to community of the parts of the bearings, permitting mass production of the roller bearings, and realizing cost-down of the bearings.

Furthermore, in the barrel shaped roller bearing according to the present invention, by providing the crowing mainly around the ends of the rolling surfaces of the barrel shaped rollers, it is possible to reduce the edge stress without utilizing the conventional means for extending the service life, to increase the service life of the roller bearing due to reduction of unevenness of the configuration of the rollers, and to reduce the production cost of the bearing.

I claim:

1. A roller bearing comprising an inner race, an outer race and rollers arranged between said outer and inner races, characterized in that radius of curvature (Rk) of a contacting portion between a rolling surface of each of said rollers and a chamfer portion of said roller satisfies the following relationship:

$$0.04 \sqrt{Da \cdot lr} \leq Rk \leq 0.20 \sqrt{Da \cdot lr}$$

wherein Da represents maximum diameter of said roller, and lr represents a length of said roller.

* * * * *